(12) United States Patent
Bischoff

(10) Patent No.: US 6,978,858 B1
(45) Date of Patent: Dec. 27, 2005

(54) VISUAL REFERENCE CONTROL APPARATUS FOR HYDRAULIC ACTUATOR SYSTEMS

(76) Inventor: David R. Bischoff, 11441 Fort King Rd., Dade City, FL (US) 33525

(*) Notice: Subject to any disclaimer, the term of this patent is extended or adjusted under 35 U.S.C. 154(b) by 0 days.

(21) Appl. No.: 10/868,655

(22) Filed: Jun. 14, 2004

(51) Int. Cl.⁷ .................................... B62D 5/04
(52) U.S. Cl. .................................. 180/403; 180/417
(58) Field of Search ............................ 180/403, 417

(56) References Cited

U.S. PATENT DOCUMENTS

| | | | |
|---|---|---|---|
| 2,987,135 A * | 6/1961 | Harvey | 180/421 |
| 3,614,990 A * | 10/1971 | Schnitzler | 180/168 |
| 3,939,938 A * | 2/1976 | Inoue | 180/422 |
| 4,184,333 A * | 1/1980 | Blaha et al. | 60/420 |
| 4,297,845 A * | 11/1981 | Kyster | 60/384 |
| 4,595,867 A | 6/1986 | Cognevich, Sr. | |
| 4,802,546 A * | 2/1989 | Sakikawa et al. | 180/440 |
| 4,860,844 A | 8/1989 | O'Neil | |
| 4,871,039 A * | 10/1989 | Daido et al. | 180/446 |
| 4,909,527 A * | 3/1990 | Hosotani | 280/88 |
| 5,024,417 A | 6/1991 | Voxbrunner | |
| 5,253,604 A | 10/1993 | Bohlin | |
| 5,347,458 A | 9/1994 | Serizawa et al. | |
| 5,520,059 A * | 5/1996 | Garshelis | 73/862.335 |
| 6,219,604 B1 | 4/2001 | Dilger | |
| 6,817,437 B2 * | 11/2004 | Magnus et al. | 180/403 |
| 2003/0121717 A1 * | 7/2003 | Tokumoto | 180/446 |

* cited by examiner

*Primary Examiner*—Kevin Hurley
(74) *Attorney, Agent, or Firm*—Charles J. Prescott

(57) ABSTRACT

A control apparatus for controlling movement of a hydraulic actuator of a hydraulic control system associated with, for example, an off-road vehicle or a vessel. A geared transmission adapted to be connectable to a support member has rotatable input and output shafts, and a speed ratio of greater than unity and preferably as high as 5 to 10:1. A manually operated steering wheel is supported for substantially free rotation with, the input shaft. A rotatably actuated voltage generator is driven in rotation by the transmission output shaft to produce a high d.c. voltage, low current output signal which is proportional to the speed of rotation of the steering wheel while the output signal polarity is determined by the direction of movement of the steering wheel. A hydraulic valve driver transforms the d.c. output signal into a proportional pulse width modulated voltage control signal which controls position and movement of the hydraulic actuator.

12 Claims, 1 Drawing Sheet

US 6,978,858 B1

VISUAL REFERENCE CONTROL APPARATUS FOR HYDRAULIC ACTUATOR SYSTEMS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

Figure 1:
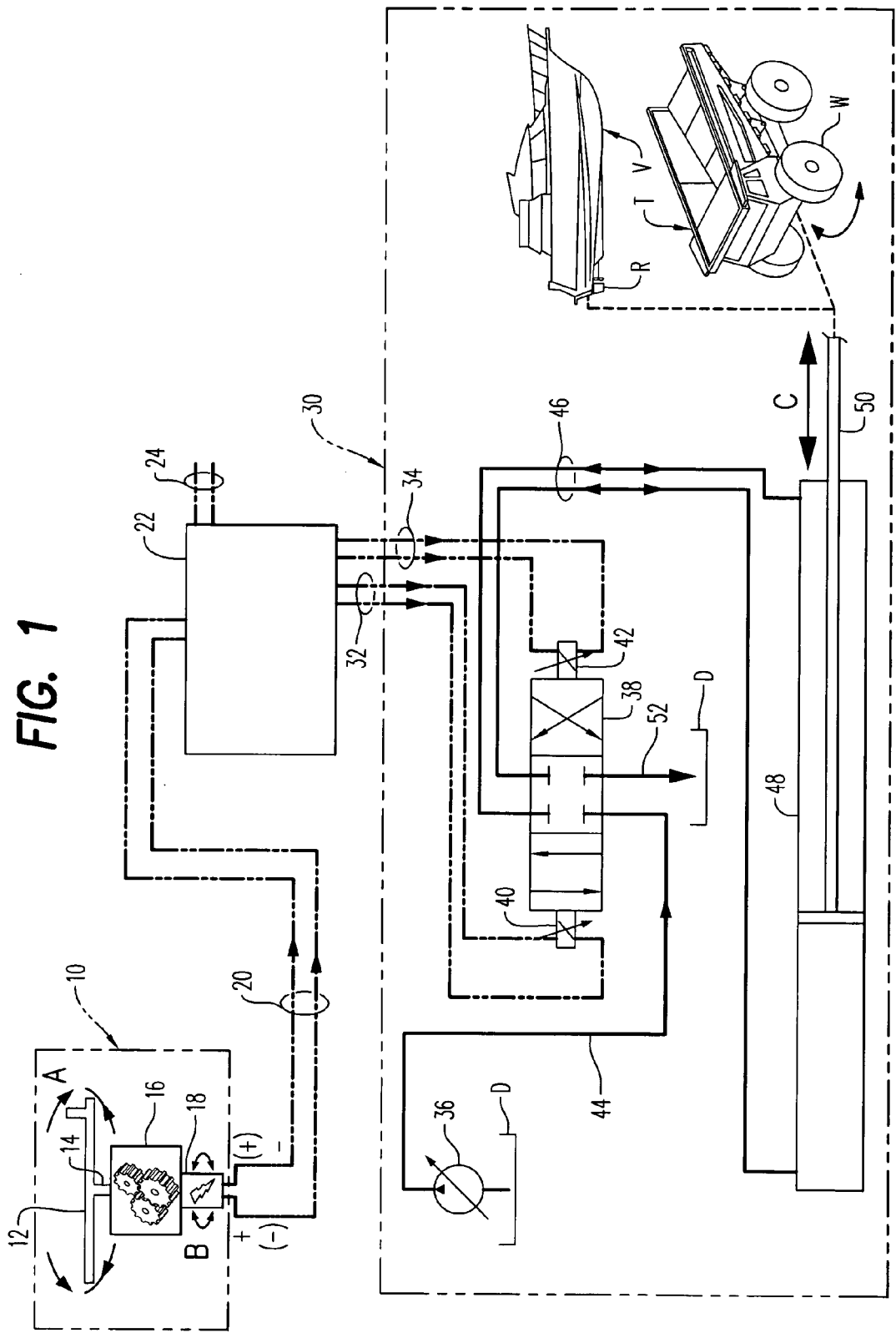

This invention relates generally to vehicle control systems and more particularly to hydraulic actuator controlled systems for larger vehicles and vessels which control components and steering systems within such environments.

2. Description of Related Art

Larger vehicles, vessels, systems and equipment require hydraulic actuators for the control of components and steering systems therewithin. Mechanical and pneumatic systems and those utilizing electric actuators typically lack sufficient power to deliver linear and rotational forces necessary to operate the components of such larger environments. Typical environments referred to herein would include off-road earth moving equipment, steering systems on larger vessels and ships and equipment requiring hydraulic actuators and hydraulic systems for their component control.

In such conventional hydraulically controlled vehicles, however, high pressure hydraulic fluid lines must be routed to the control mechanisms in proximity to an operator who will manipulate these control mechanisms such as steering wheels and levers to regulate hydraulic fluid flow to the hydraulic actuators. Such systems are complex, expensive and prone to leakage and in use damage which may inhibit fluid flow or cause high pressure fluid line rupture.

One system known to applicant which overcomes such limitations is disclosed in U.S. Pat. No. 4,860,844 invented by O'Neil which teaches a power steering system suitable for large off-highway and other similar vehicles. In this system, no mechanical linkages or hydraulic connections enter the driver's cab. Rather, torque demand signals are produced by an electromechanical torque sensor that measures the deflection of a torsion spring caused by movement of a steering wheel. Hydraulic actuators then respond to the signal produced to properly steer the vehicle.

The following additional patents are known to applicant which are generally in the category of "steer by wire" steering systems as follows:

U.S. Pat. No. 6,219,604 to Dilger
U.S. Pat. No. 5,347,458 to Serizawa
U.S. Pat. No. 5,024,417 to Voxbrunner
U.S. Pat. No. 4,595,867 to Cognevich, Sr.
U.S. Pat. No. 5,253,604 to Bohlin The present invention provides a preferably visual reference control apparatus for controlling the movement of a hydraulic actuator of a hydraulic control system such as that found in off-road vehicles and in hydraulic steering systems for vessels. A steering wheel is provided which is substantially freely rotatable with the input shaft of a geared transmission which produces higher rotational output speed which, in turn, drives a rotatably actuated voltage generator. The voltage generator will then produce a direct current or d.c. voltage, low current output proportional to the speed that the steering wheel is turned and in the appropriate (+/−) voltage polarity, depending upon direction of steering wheel rotation. This output is then converted into a pulse width modulated (PWM) output current control signal typically required to control the movement of a hydraulic actuator.

BRIEF SUMMARY OF THE INVENTION

This invention is directed to a control apparatus for controlling movement of a hydraulic actuator of a hydraulic control system associated with, for example, an off-road vehicle or a vessel. A geared transmission adapted to be connectable to a support member has rotatable input and output shafts, and a speed ratio of greater than unity and preferably as high as 7 to 10:1. A manually operated steering wheel is supported for free rotation with, the input shaft. A rotatably actuated voltage generator is driven in rotation by the transmission output shaft to produce a d.c. voltage, low current output signal which is proportional to the speed of rotation of the steering wheel while the output signal polarity is determined by the direction of movement of the steering wheel. A hydraulic valve driver creates a d.c. output into a proportional pulse width modulated current which controls position and movement of the hydraulic actuator.

It is therefore an object of this invention to provide a visual reference control apparatus for controlling the movement of a hydraulic actuator of hydraulic control systems.

It is another object of this invention to provide a control apparatus for controlling the movement of a hydraulic actuator of the hydraulic control system of vehicles and hydraulic steering systems for larger vessels and ships.

Yet another object of this invention is to utilize a rotatably actuated voltage generator coupled to a steering wheel through a geared transmission for heightened rotational speed of the voltage generator to produce a voltage output suitable for regulating the hydraulic actuators within a hydraulic control system.

Still another object of this invention is to provide a rapid response control apparatus for a hydraulic control system which is suitable for vessel steering systems.

In accordance with these and other objects which will become apparent hereinafter, the instant invention will now be described with reference to the accompanying drawings.

BRIEF DESCRIPTION OF THE SEVERAL VIEWS OF THE DRAWING(S)

FIG. 1 is a schematic view of the invention in conjunction with a hydraulic actuator and hydraulic control system for an off road vehicle or steering system of a vessel.

DETAILED DESCRIPTION OF THE INVENTION

Referring now to FIG. 1, the invention in its broadest aspect is there shown generally at numeral 10. This apparatus 10 includes a conventional steering wheel 12 which may have a steering rim or knob attached thereto as shown and also having a center shaft 14 which is connected to the input shaft of a geared transmission 16. The geared transmission 16 is typically structured for attachment to a support structure or member such as the control panel of a vehicle or other hydraulic actuator controlled system environment as will be described herebelow.

The geared transmission 16 is preferably of the type wherein the rotational input of the input shaft 14 will be multiplied by the gear arrangement contained therein so that the output shaft will rotate at a proportionately higher speed (speed multiplier) than that of the input shaft 14. A preferred gear ratio is in the range of 7 to 10:1 and more broadly, up to 20:1 wherein a given speed input will result in an output rotational speed of up to 20 times that of the rotational speed of the steering wheel 12.

The output shaft of the geared transmission 16 is coupled to a rotatably actuated voltage generator 18 which produces a relatively low current, d.c. voltage output when rotated at B. The voltage produced is proportional to the rotational speed and therefore proportional to the speed at which the steering wheel 12 is rotated. It is preferred that the voltage/ speed ratio be linear for heightened accuracy of system control and visual reference feedback as will be described herebelow. A relatively low voltage ripple output at lower rpm which diminishes at increased rpm is also preferred. Additionally, a low current output is also preferred in the range of less than 2 mA at all rotational input speeds. Moreover, the voltage generator 18 is polarity sensitive in that rotation A of the steering wheel 12 in one direction will produce a positive (+) voltage, while rotation of the steering wheel 12 in the opposite direction will produce a negative (−) voltage.

The voltage signal output 20 is fed from the voltage generator 18 into an electro-hydraulic valve driver 22 which converts the voltage signals 20 into a pulse width modulated (PWM) output control current 32 and 34. These PWM signals 32 and 34 are then fed into electrical coils 40 and 42 of a hydraulic proportional valve 38 within system 30. The valve 38 is a closed center, bi-directional dual coil, spool type having four ports. A hydraulic pump 36 draws hydraulic fluid from a hydraulic fluid reservoir D through line 44 into the valve 38 whereupon the electrical coils 40 and 42 then regulate pressurized fluid flow through conduits 46 into a hydraulic actuator 48. The hydraulic actuator 48 includes a linear actuator 50 which moves in the direction of arrow C responsive to controlled pressure fluid fed into the actuator 48. All excess hydraulic fluid is returned to the reservoir the valve 38 through conduit 52. It is noted that hydraulic rotary actuators are intended to be within the scope of this invention.

The hydraulic actuator 48 may typically be incorporated into the steering system of a vessel V wherein the rudder R is controlled by the linear actuator 48 and also may be incorporated into an off road earth moving vehicle shown typically at T wherein the hydraulic actuator 48 is used for steering the steered wheels W as well as regulating other hydraulic actuators to perform other functions and movement within such vehicles T.

In its preferred embodiment, the present invention affords the benefit of visual reference feedback. That is to say that the operator will rotate the steering wheel 12 in an appropriate direction and at a desired speed to effect the desired result. For example, in steering a vessel V, the pilot will typically rotate the steering wheel 12 at a certain speed and the rudder R will quickly move a certain displacement causing the vessel V to turn. If the turn needs to be tightened or shortened, the steering wheel 12 will be rotated at a higher speed. When the desired rudder R rotation has been effected, the steering wheel 12 will be stopped, the vessel V will effect the desired turn, and the pilot will then turn the steering 12 in the opposite direction at a desired speed to effect rudder R return to neutral or to another desired direction for vessel V steering control.

With respect to an off road vehicle T, the same visual feedback will be provided. The rate of rotation of the steering wheel 12 will determine the amount of steered wheel W movement. The more rapidly the steering wheel 12 is rotated, the greater the steering angle of the steered wheel W. Reversal of direction of the steering wheel 12 rotation will bring the vehicle T and its steered wheel W back to a reoriented straight or other steered wheel W direction as desired. Again, in both examples, the rate of rotation of the steering wheel 12 will determine the hydraulic actuator 48 (or its equivalent) displacement of its actuator rod 50 with the operator receiving the benefit of visual feedback responsive to steering wheel rotation.

The preferred components utilized in the present invention include a tachometer generator manufactured by Servo-Tek of Hawthorne, N.J., model DA-7533D-1. The gearbox utilized was supplied by WW Grainger of Tampa, Fla. manufactured by Dayton Corporation, part number 1L516. An alternate gearbox is manufactured by the Strober Corporation, part number PE-201 or PE-301. The electro hydraulic valve driver 22 is manufactured by Axiomatic Technologies Corporation, model DSD-SMB-SC-01. The coupler and adapter was manufactured by the inventor and utilized for connection of the steering wheel 12 to the gearbox 16 and input and for the output of the gearbox 16 into the voltage generator 18.

The hand wheel selected was supplied by McMaster Carr Supply of Atlanta, Ga., model 6335k53 having a diameter of approximately 13" although the diameter may range between 3" and 16" depending upon the particular speed requirements of each system. It is noted that, except for frictional restraints within the system, the steering wheel is generally freely rotatable to drive the gear train within the gearbox 16 and the rotational force necessary to drive the voltage generator 18. As the apparatus 10 is not associated directly with movement of pressurized hydraulic fluid, the rotational forces required to rotate the steering wheel 12 are therefore minimal.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A control apparatus for controlling movement of a hydraulic actuator of a hydraulic control system, comprising:
    a geared transmission adapted to be connectable to a support member and having rotatable input and output shafts, said transmission having a speed ratio equal to a ratio of output shaft to input shaft speed of rotation, said speed ratio being greater than 1:1;
    a manually operated steering wheel supportedly connected to, and substantially freely rotatable with, said input shaft;
    a rotatably actuated voltage generator having a rotatable input shaft operably connected to said output shaft whereby rotation of said steering wheel produces a low current d.c. voltage, output of said voltage generator for controlling movement and positioning of the hydraulic actuator, said d.c. voltage output being proportional only to the speed of rotation of said steering wheel, and having a polarity (+/−) determined by direction of rotation of said steering wheel.

2. A control apparatus as set forth in claim 1, further comprising:
said hydraulic control system operably connected within a vehicle for controlling a component of the vehicle.

3. A control apparatus as set forth in claim 2, wherein:
the vehicle is an off road equipment.

4. A control apparatus as set forth in claim 3, wherein:
the vehicle is a vessel and the component is for steering the vessel.

5. A visual reference control apparatus for controlling movement of a hydraulic actuator of a hydraulic control system, comprising:
a geared transmission adapted to be connectable to a support member and having rotatable input and output shafts, said transmission having a speed ratio equal to a ratio of output shaft to input shaft speed of rotation, said speed ratio being greater than 1:1 and up to about 20:1;
a manually operated steering wheel supportedly connected to, and substantially freely rotatable with, said input shaft;
a rotatably actuated voltage generator having a rotatable input shaft operably connected to said output shaft whereby rotation of said steering wheel produces a d.c. voltage and polarity (+/−) output of said voltage generator, said d.c. voltage output being proportional to the speed and direction, respectively, of rotation of said steering wheel, visual observation of movement and positioning of the hydraulic actuator responsive to speed of rotation of said steering wheel providing visual feedback.

6. A control apparatus as set forth in claim 5, further comprising:
said hydraulic control system operably connected within a vehicle for controlling a component of the vehicle.

7. A control apparatus as set forth in claim 6, wherein:
the vehicle is an off road equipment.

8. A control apparatus as set forth in claim 7, wherein:
the vehicle is a vessel and the component is for steering the vessel.

9. A visual reference control apparatus for controlling movement of a hydraulic actuator of a hydraulic control system, comprising:
a geared transmission adapted to be connectable to a support member and having rotatable input and output shafts, said transmission having a speed ratio equal to a ratio of output shaft to input shaft speed of rotation, said speed ratio being greater than 1:1;
a manually operated steering wheel supportedly connected to, and substantially freely rotatable with, said input shaft;
a rotatably actuated voltage generator having a rotational input therefor operably connected to said output shaft whereby rotation of said steering wheel produces a high d.c. voltage, low current output signal from said voltage generator, said d.c. voltage output being proportional only to the speed of rotation of said steering wheel and having a positive (+) or negative (−), polarity based upon direction of rotation of said steering wheel;
a hydraulic valve driver operably connected to receive said output signal and to produce therefrom a pulse width modulated (PWM) output control signal which controls the movement and positioning of the hydraulic actuator;
visual observation of movement and positioning of the hydraulic actuator or equipment connected thereto providing real time visual feedback for determining further movement of said steering wheel.

10. A control apparatus as set forth in claim 9, further comprising:
said hydraulic control system operably connected within a vehicle for controlling a component of the vehicle.

11. A control apparatus as set forth in claim 10, wherein:
the vehicle is an off road equipment.

12. A control apparatus as set forth in claim 11, wherein:
the vehicle is a vessel and the component is for steering the vessel.

* * * * *